(12) United States Patent
Mettrick et al.

(10) Patent No.: US 10,378,599 B2
(45) Date of Patent: Aug. 13, 2019

(54) BRAKE ROTOR WITH DECORATIVE INSERT

(71) Applicant: GM Global Technology Operations LLC, Detroit, MI (US)

(72) Inventors: Christopher J. Mettrick, Whitby (CA); Mark T. Riefe, Brighton, MI (US); Michael L. Holly, St. Clair Shores, MI (US); James A. Webster, Bloomfield Hills, MI (US); Michael J. Walker, Shelby Township, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/643,004

(22) Filed: Jul. 6, 2017

(65) Prior Publication Data
US 2019/0011004 A1    Jan. 10, 2019

(51) Int. Cl.
*F16D 65/12* (2006.01)
*B60R 13/00* (2006.01)
*F16D 65/02* (2006.01)

(52) U.S. Cl.
CPC .......... *F16D 65/127* (2013.01); *B60R 13/005* (2013.01); *F16D 65/122* (2013.01); *F16D 65/125* (2013.01); *F16D 2065/1328* (2013.01); *F16D 2200/0004* (2013.01); *F16D 2200/0039* (2013.01); *F16D 2250/0015* (2013.01); *F16D 2250/0038* (2013.01)

(58) Field of Classification Search
CPC .... F16D 65/122; F16D 65/125; F16D 65/127; F16D 2200/0004; F16D 2250/0015; F16D 2250/0038; F16D 65/12; F16D 2069/004; F16D 2069/002; B60R 13/005
USPC ...................................... 188/218 XL
See application file for complete search history.

(56) References Cited

U.S. PATENT DOCUMENTS

| 5,613,578 A * | 3/1997 | Moseley | F16D 65/125 188/218 XL |
| 6,193,027 B1 * | 2/2001 | Krenkel | F16D 65/126 188/218 XL |
| 6,457,566 B1 * | 10/2002 | Toby | F16D 65/12 188/1.11 W |
| 8,893,863 B2 * | 11/2014 | Meckel | F16D 65/12 188/218 XL |
| 9,279,467 B2 | 3/2016 | Hanna et al. | |
| 2006/0042886 A1 * | 3/2006 | Peters | B60Q 1/2661 188/1.11 W |

(Continued)

*Primary Examiner* — Thomas W Irvin
(74) *Attorney, Agent, or Firm* — Cantor Colburn LLP

(57) ABSTRACT

A brake rotor comprising a brake pad wear surface; a hat surface; and a decorative insert comprising an insert material, the decorative insert disposed on the brake pad wear surface, the hat surface, or both; wherein at least one of a friction coefficient between the decorative insert and a brake pad is substantially the same as a friction coefficient between the brake pad wear surface and the brake pad, a wear rate of the decorative insert is substantially the same as or greater than a wear rate of the brake pad wear surface, or a wear rate of the decorative insert is substantially the same as or greater than a wear rate of the hat surface; and at least a portion of the decorative insert is visible on the brake pad wear surface, the hat surface, or both.

12 Claims, 3 Drawing Sheets

(56) References Cited

U.S. PATENT DOCUMENTS

| | | | |
|---|---|---|---|
| 2011/0048871 A1* | 3/2011 | Meckel | F16D 65/12 188/71.6 |
| 2012/0186919 A1* | 7/2012 | Hanna | F16D 65/12 188/218 XL |
| 2013/0180807 A1* | 7/2013 | Iwai | F16D 65/12 188/26 |
| 2017/0122392 A1* | 5/2017 | Lembach | F16D 65/127 |

* cited by examiner

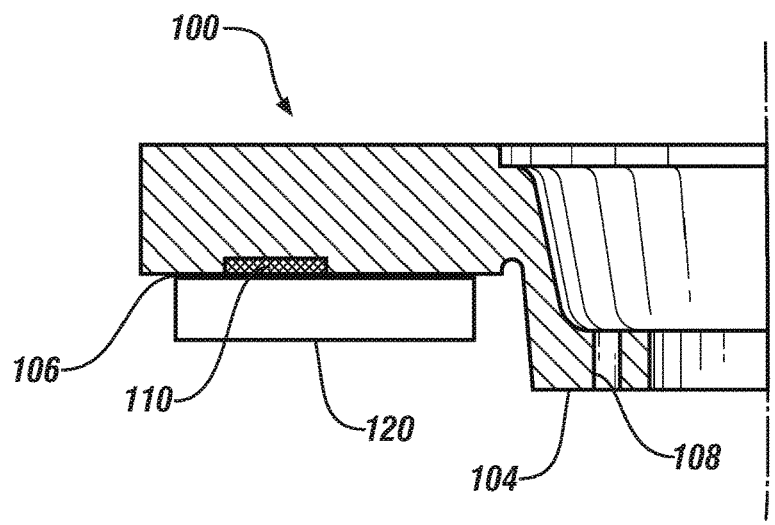
FIG. 3
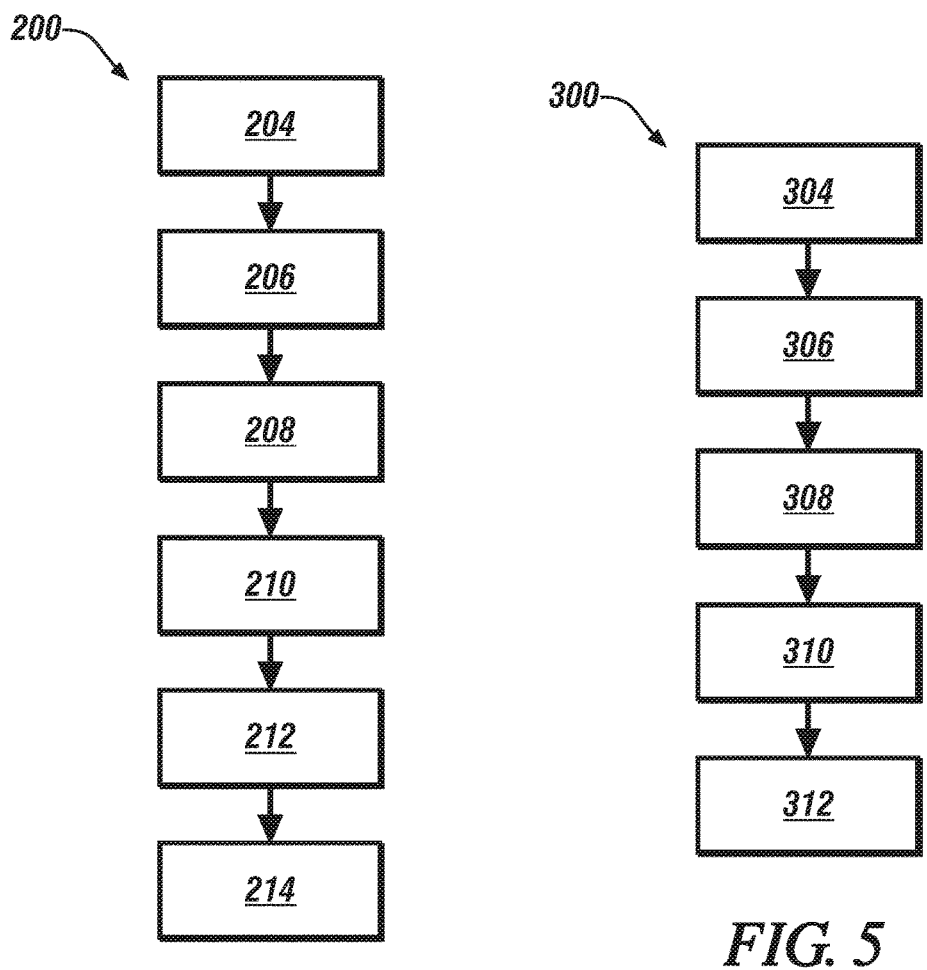
FIG. 4
FIG. 5

BRAKE ROTOR WITH DECORATIVE INSERT

INTRODUCTION

The subject disclosure relates to a brake rotor having a decorative insert.

Disk brakes are commonly used for slowing or stopping the rotation of a wheel of a vehicle. Generally, a disk brake system includes a brake rotor connected to the wheel and/or an axle of the vehicle and a caliper. Many manufactured components, such as brake rotors, are unmarked due to difficulties of marking. For components that will experience wear during use, effective marking is challenging or impossible to maintain. Regarding brake rotors, for example, a marking including print, a label, or etching on a frictional surface can quickly wear in response to everyday driving conditions.

Accordingly, it is desirable to provide a method to effectively and lastingly mark components without adding prohibitive cost to the manufacturing process or compromising component quality.

SUMMARY

In one exemplary embodiment, a brake rotor comprises a brake pad wear surface, a hat surface, and a decorative insert comprising an insert material. The decorative insert is disposed on the brake pad wear surface, the hat surface, or both. At least one of a friction coefficient between the decorative insert and a brake pad is substantially the same as a friction coefficient between the brake pad wear surface and the brake pad, a wear rate of the decorative insert is substantially the same as or greater than a wear rate of the brake pad wear surface, or a wear rate of the decorative insert is substantially the same as or greater than a wear rate of the hat surface. At least a portion of the decorative insert is visible on the brake pad wear surface, the hat surface, or both.

In addition to one or more of the features described herein, the insert material comprises a metallic material, a ceramic material, a mineral material, a glass material, or a combination thereof.

In an embodiment, the insert material comprises aluminum, copper, manganese, a porcelain enamel, titanium, steel, stainless steel, nickel, zirconium, silicon carbide, boron carbide, tungsten carbide, nickel oxide, zirconium oxide, chromium carbide, alumina, aluminum titanium, magnesium zirconate, silicon nitride, boron nitride, titanium diboride, a silicate mineral, or a combination comprising at least one of the foregoing.

In an embodiment, the decorative insert is disposed on the brake pad wear surface.

In an embodiment, the decorative insert defines a custom design feature.

In an embodiment, the brake rotor comprises iron, titanium, steel, copper, carbon, silicon carbide, nickel, titanium boride, aluminum, boron nitride, cobalt, magnesium, manganese, an alloy thereof, a metal matrix composite thereof, or a combination comprising at least one of the foregoing.

In another exemplary embodiment, a method for forming a decorative insert on a brake pad wear surface, a hat surface, or both, of a brake rotor comprises positioning an insert material into a mold and casting the brake rotor in the mold around the insert material. The brake rotor is processed so that at least a portion of the insert material is visible on the brake pad wear surface, the hat surface, or both, of the brake rotor. At least one of a friction coefficient between the decorative insert and a brake pad is substantially the same as a friction coefficient between the brake pad wear surface and the brake pad, a wear rate of the decorative insert is substantially the same as or greater than a wear rate of the brake pad wear surface, or a wear rate of the decorative insert is substantially the same as or greater than a wear rate of the hat surface.

In an embodiment, a thickness of the decorative insert is about 0.5 to about 10 millimeters, preferably about 0.5 to about 5 millimeters, more preferably 0.5 to about 3.0 millimeters.

In an embodiment, the insert material comprises a metallic material, a ceramic material, a mineral material, a glass material, or a combination thereof.

In an embodiment, the insert material comprises aluminum, copper, manganese, a porcelain enamel, titanium, steel, stainless steel, nickel, zirconium, silicon carbide, boron carbide, tungsten carbide, nickel oxide, zirconium oxide, chromium carbide, alumina, aluminum titanium, magnesium zirconate, silicon nitride, boron nitride, titanium diboride, a silicate mineral, or a combination comprising at least one of the foregoing.

In an embodiment, the method further comprises performing at least one process comprising: a nitriding process; a carburizing process; a boronizing process; or an oxidation process, to the brake rotor after the step of casting.

In an embodiment, wherein the decorative insert is formed on the brake pad wear surface.

In yet another exemplary embodiment, a method for forming a decorative insert on a brake pad wear surface, a hat surface, or both, of a brake rotor comprises providing the brake rotor having at least one indentation on the brake pad wear surface, the hat surface, or both. An insert material is applied to the at least one indentation to form the decorative insert. At least one of a friction coefficient between the decorative insert and a brake pad is substantially the same as a friction coefficient between the brake pad wear surface and the brake pad, a wear rate of the decorative insert is substantially the same as or greater than a wear rate of the brake pad wear surface, or a wear rate of the decorative insert is substantially the same as or greater than a wear rate of the hat surface. At least a portion of the decorative insert is visible on the brake pad wear surface, the hat surface, or both.

In an embodiment, further comprising chemically or mechanically forming the at least one indentation on the brake pad wear surface, the hat surface, or both.

In an embodiment, the at least one indentation has a depth of about 0.5 to about 10 millimeters, preferably about 0.5 to about 5 millimeters, more preferably 0.5 to about 3.0 millimeters.

In an embodiment, the insert material is applied by at least one of laser powder cladding, laser spraying, laser deposition, chemical vapor deposition, physical vapor deposition, sputtering deposition, powder coating, thermal spraying, plasma spraying, sintering, electrodeposition, vacuum plating, or a combination thereof.

In an embodiment, the insert material comprises a metallic material, a ceramic material, a mineral material, a glass material, or a combination thereof.

In an embodiment, the insert material comprises aluminum, copper, manganese, a porcelain enamel, titanium, steel, stainless steel, nickel, zirconium, silicon carbide, boron carbide, tungsten carbide, nickel oxide, zirconium oxide, chromium carbide, alumina, aluminum titanium, magnesium zirconate, silicon nitride, boron nitride, titanium diboride, a silicate mineral, or a combination comprising at least one of the foregoing.

In an embodiment, the method further comprises performing at least one process comprising: a nitriding process; a carburizing process; a boronizing process; or an oxidation process, to the brake rotor after the step of applying the insert material.

In an embodiment, the decorative insert is formed on the brake pad wear surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a cross-sectional view of a brake rotor according to an embodiment;

FIG. 4 is a schematic illustration of a method according to an embodiment;

FIG. 5 is a schematic illustration of a method according to an embodiment;

DETAILED DESCRIPTION

The following description is merely exemplary in nature and is not intended to limit the present disclosure, its application or uses. It will be understood that, although the terms first, second, third etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In accordance with an exemplary embodiment, a brake rotor including a decorative insert is provided. The decorative insert comprises an insert material and is disposed on the brake pad wear surface, the hat surface, or both, of the brake rotor. In the brake rotor, at least a portion of the decorative insert is visible on the brake pad wear surface, the hat surface, or both.

As used herein, a decorative insert disposed on the brake pad wear surface, the hat surface, or both, means that at least a portion of the decorative insert is visible on one or more of these surfaces of the brake rotor. In other words, portions of the decorative insert can be located on these visible surfaces of the brake rotor, whereas portions of the decorative insert can also be located below these visible surfaces of the brake rotor.

Figure 1:
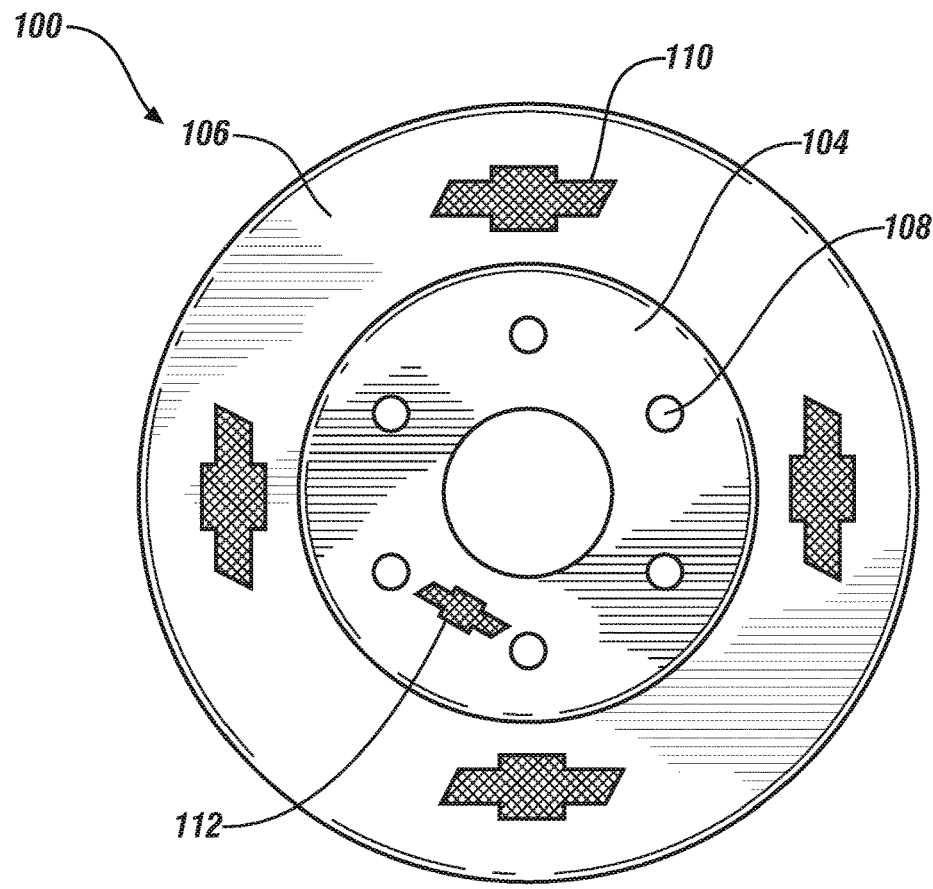
FIG. 1 is a plan view of a brake rotor according to an embodiment.
Figure 2:
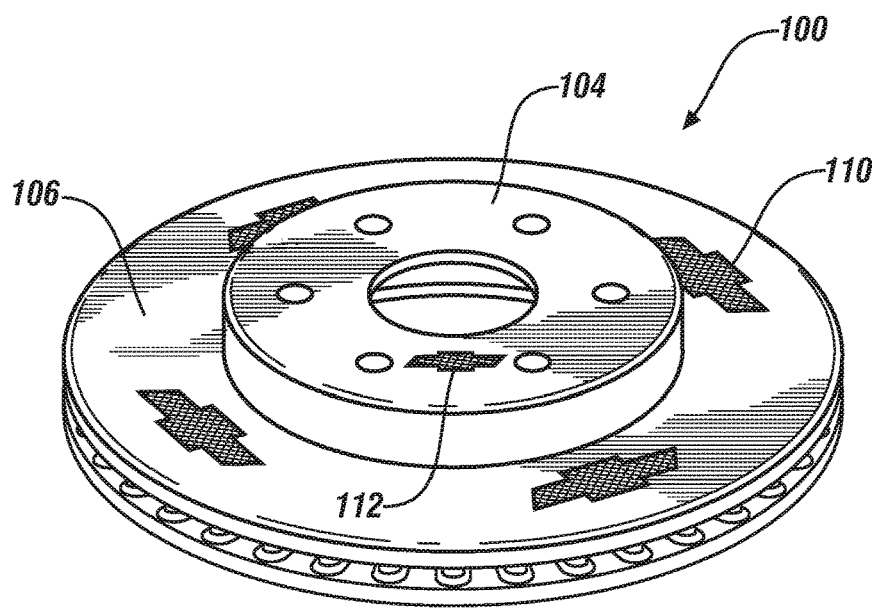
FIG. 2 is a perspective view of a brake rotor according to an embodiment.

FIGS. 1 and 2 show views of a brake rotor according to exemplary embodiments. The brake rotor 100 includes a brake pad wear surface 106 and a hat surface 104. The hat surface 104 includes bolt openings 108 for receiving bolts that will connect the brake rotor 100 to the wheel and vehicle body—i.e., an axle hub (not shown). FIG. 3 shows a view of the interaction between a brake pad 120 and the brake pad wear surface 106; additional components, including a second brake pad on the opposite side of the brake rotor 100, are omitted for simplicity. As shown in FIG. 3, the brake pad wear surface 106 is positioned adjacent to a brake pad 120 when installed on a vehicle for operation. In operation, when a brake is applied by a driver of the vehicle, the brake pad 120 contacts the brake pad wear surface 106 while the brake rotor 100 is rotating, causing the brake rotor 100 and thus the vehicle to slow down. For this purpose, the brake rotor 100 must be highly robust and the brake pad wear surface 106 must be able to withstand heavy intermittent frictional forces over the useful life of the brake rotor 100.

Decorative inserts 110/112 can be positioned on any location of the brake pad wear surface 106 and/or the hat surface 104 of the brake rotor 100. In an embodiment, the decorative insert 110/112 is located on multiple locations, on both the brake pad wear surface 106 and the hat surface 104. In still another embodiment, the brake rotor 100 can include multiple decorative inserts 110/112 that differ in size, material composition, depth, appearance, and shape. In an embodiment, the hat surface 104 includes the decorative insert 112. In an embodiment, the decorative insert 110 is located (i.e., disposed) on the brake pad wear surface 106.

In an embodiment, the decorative insert 110/112 defines a custom design feature. The custom design feature can include company symbols, designs, graphics, logos, alphanumeric symbols, and images such as an image of a vehicle. In the illustrated embodiment, the decorative insert is a symbol for the Chevrolet® automotive brand, referred to as the "bowtie" emblem. The custom design feature can also include owner-customized symbols, designs, graphics, logos, alphanumeric symbols, and images. The shape of the decorative insert can be used to provide a visually distinct appearance, such as to indicate the source, owner, or type of the marked component. The marking can be made for identification—e.g., identifying the part in connection with inventorying, distribution, ownership, and/or selling, for branding, for customization, or for aesthetic purposes. As a particular example identification purpose, the decorative insert 110/112 can operate as a distinguishing feature visible during operation of the vehicle—i.e., while the brake rotor 100 is in its operating position on the vehicle.

In an embodiment, the decorative insert 110/112 has a thickness of about 0.5 to about 10 millimeters (mm), about 0.5 to about 7.5 mm, about 0.5 to about 5 mm, about 0.5 to about 4 mm, about 0.5 to about 3 mm, about 0.5 to about 2 mm, or about 0.5 to about 1 mm. For example, the decorative insert 110/112 has a thickness of about 0.75 to about 8 mm, about 1.0 to about 6 mm, about 1.25 to about 4 mm, about 1.5 to about 3 mm, or about 1.75 to about 2.0 mm. As used herein, the thickness is the largest feature of the decorative insert 110/112 in the plane perpendicular to the brake pad wear surface 106 and the hat surface 104. In still another embodiment, a plurality of decorative inserts 110/112 is provided with each decorative insert independently having a thickness as described.

In an embodiment, the decorative insert 110/112 has a width of about 10 to about 150 mm, about 25 to about 150 mm, about 50 to about 150 mm, or about 75 to about 150 mm. For example, the decorative insert 110/112 has a width of about 20 to about 120 mm, about 20 to about 100 mm, or about 20 to about 80 mm. As used herein, the width is the widest horizontal feature of the decorative insert 110/112 in the plane of the brake pad wear surface 106 and the hat surface 104. In still another embodiment, a plurality of decorative inserts 110/112 is provided with each decorative insert 110/112 independently having a width as described.

In an embodiment, a plurality of decorative inserts 110/112 are included and have a spacing of about 0.5 to about 150 mm, about 0.5 to about 100 mm, about 0.5 to about 50 mm, about 0.5 to about 25 mm, about 0.5 to about 15 mm, about 0.5 to about 10 mm, about 0.5 to about 5 mm, about 0.5 to about 2.5 mm, or about 0.5 to about 1.0 mm. In still another embodiment, a plurality of decorative inserts 110/112 is included with each decorative insert 110/112 independently having a spacing from an adjacent decorative insert 110/112 as described.

In the brake rotor 100, at least one of a friction coefficient between the decorative insert 110 and a brake pad 120 is substantially the same as a friction coefficient between the brake pad wear surface 106 and the brake pad 120, a wear rate of the decorative insert 110 is substantially the same as or greater than a wear rate of the brake pad wear surface 106, or a wear rate of the decorative insert 110 is substantially the same as or greater than a wear rate of the hat surface 104. In other words, at least one of the portion of the brake pad wear surface 106 that includes the decorative insert 110 has a friction coefficient between the decorative insert 110 and the brake pad 120 that is substantially the same as the friction coefficient between the brake pad wear surface 106 and the brake pad 120 for the portion of the brake pad wear surface 106 that does not include the decorative insert 110, the portion of the brake pad wear surface 106 that includes the decorative insert 110 has a wear rate that is substantially the same as or greater than the wear rate of the brake pad wear surface 106 that does not include the decorative insert 110, the portion of the hat surface 104 that includes the decorative insert 110 has a wear rate that is substantially the same as or greater than the wear rate of the hat surface 104 that does not include the decorative insert 110.

In an embodiment, the friction coefficient between the decorative insert 110 and a brake pad 120 is ±0.1, ±0.08, ±0.05, or ±0.03 of the friction coefficient between the brake pad wear surface 106 and the brake pad 120. In another embodiment, the friction coefficient between the decorative insert 110 and a brake pad 120 is ±10%, ±8%, ±5%, or ±0.3% of the friction coefficient between the brake pad wear surface 106 and the brake pad 120. Suitable brake pads include those available in the art, and can include organic brake pads, semi-metallic brake pads, ceramic brake pads, or the like. Brake pad materials include, but are not limited to, glasses, fibers, rubbers, carbon, Kevlar, steel, iron, copper, manganese, graphite, ceramics, ceramic composites, or the like. The friction coefficient can be measured by standard industry methods, including but not limited to JASO C-406 or SAE J2430.

In an embodiment, the wear rate of the decorative insert 110 is about 10% greater, about 8% greater, about 5% greater, about 3% greater, or about 1% greater than the wear rate of the brake pad wear surface 106. In an embodiment, the wear rate of the decorative insert 110 is about 10% greater, about 8% greater, about 5% greater, about 3% greater, or about 1% greater than the wear rate of the hat surface 104. The wear rate can be measured by standard industry methods, including but not limited to JASO C427-83 or SAE J2707.

The insert material can include a metallic material, a ceramic material, a mineral material, a glass material, or a combination thereof. In an embodiment, the insert material comprises aluminum, copper, manganese, a porcelain enamel, titanium, steel, stainless steel, nickel, zirconium, silicon carbide, boron carbide, tungsten carbide, nickel oxide, zirconium oxide, chromium carbide, alumina, aluminum titanium, magnesium zirconate, silicon nitride, boron nitride, titanium diboride, a silicate mineral, or a combination comprising at least one of the foregoing.

In an embodiment, the ceramic material can include, but is not limited to, barium titanate, boron oxide, boron nitride, ferrite, porcelain, earthenware, silicon aluminum oxynitride, silicon carbide, silicon nitride, magnesium silicates, titanium carbide, zinc oxide, zirconium dioxide, titanium dioxide, alumina, beryllia, ceria, zirconia, carbon fiber, alloys thereof, composites thereof, metal matrices thereof, or combinations comprising at least one of the foregoing.

In an embodiment, the mineral material can include one or more of a silicate mineral, a carbide mineral, a phosphide mineral, a sulfide mineral, a sulfosalt mineral, a halide mineral, an oxide mineral, a spinel group, a hydroxide mineral, a carbonate mineral, a nitrate mineral, a borate mineral, a sulfate mineral, or a phosphate mineral.

In an embodiment, the porcelain enamel can include a composition comprising quartz, feldspar, marble, kaolin, boric acid, borax, $Na_2O$, $K_2O$, $Li_2O$, MnO, silica, $ZrO_2$, BaO, ZnO, SnO, CaO, MgO, CoO, $Fe_2O_3$, $F_2$, NiO, $P_2O_5$, $Al_2O_3$, $TiO_2$, or a combination thereof. In some embodiment, the porcelain enamel can include metal nanoparticles selected from gold, silver, platinum, palladium, iron, chromium, copper, cobalt, manganese, alloys thereof, and combinations thereof.

In an embodiment, the silicate mineral can include one or more of mica, olivine, quartz, feldspar, zeolite, mullite, titanite, chondrodite, humite, clinohumite, andalusite, kyanite, sillimanite, dumortierite, topaz, staurolite, datolite, zircon, thorite, hafnon, phenakite, willemite, forsterite, fayalite, tephroite, pyrope, almandine, spessartine, grossular, uvarovite, andratite, hemimorphite, lawsonite, axinite, ilvaite, epidote, zoisite, tanzanite, clinozoisite, allanite, benitoite, beryl, bazzite, sugilite, tourmaline, pezzottaite, osumilite, cordierite, sekaninaite, enstatite, ferrosilite, pigeonite, diopside, augite, jadeite, acmite, wollastonite, rhodonite, pectolite, tremolite, antigorite, chyrsotile, lizardite, halloysite, kaolinite, illite, montmorillonite, vermiculite, talc, sepiolite, palygorskite, pyrophyllite, biotie, fuchsite, muscovite, phylogoptie, lepidolite, margarite, glauconite, chlorite, leucite, sodalite, petalite, marialite, meionite, natrolite, erionite, or mordenite.

In an embodiment, the glass material can include one or more of $SiO_2$, $Al_2O_3$, $Na_2O$, $K_2O$, $Li_2O$, CaO, MgO, BaO, CaO, MgO, SrO, $Sb_2O_3$, $Fe_2O_3$, $MnO_2$, $CeO_2$, $SnO_2$, $TiO_2$, ZnO, $P_2O_5$, $Sb_2O_3$, $2MgO.Sb_2O_5$, $7MgO.Sb_2O_5$, $2ZnO.Sb_2O_5$, $7ZnO.Sb_2O_5$, $3CaO.Sb_2O_5$, $6CaO.Sb_2O_5$, $2SrO.Sb_2O_5$, $6SrO.Sb_2O_5$, $BaO.Sb_2O_5$, $4BaO.Sb_2O_5$, $Li_2O.Sb_2O_5$, $2Li_2O.Sb_2O_5$, $K_2O.Sb_2O_5$, $LaSbO_4$, $SbNbO_5$, $Sr(Ca_{0.33}Sb_{0.67})O_3$, $LiZnSbO_4$, $Li_{1.0}Sb_{0.5}O_4$, $Ba_2Al_{0.5}Sb_{0.5}O_6$, $Ba_2Ce_{0.75}SbO_6$, $ZrSbPO_7$, $Ba(Sb_{0.5}Sn_{0.5})O_3$, $LiSiSbO_5$, $Li_2Zr_2Sb_2SiO_{11}$, $NaNO_3$, $KNO_3$, $Ba(NO_3)_2$, $Na_2SO_4$, $K_2SO_4$, $CaSO_4$, $BaSO_4$, NaCl, KCl, $CaCl_2$, $CaF_2$, $Na_2SiF_6$, LiF, KF, or inorganic elements such as Al, Si, Zn, Ga, Fe, Sn.

In an embodiment, the brake rotor including the decorative insert is modified by one or more of a nitriding process, a carburizing process, a boronizing process, or an oxidation process after the step of applying the insert material. Any suitable nitriding, carburizing, boronizing, and/or oxidation process may be used, including those available in the art, to provide for the diffusion of N, C, B, and/or O into the brake rotor. Details of these processes are described below.

According to another exemplary embodiment, a method for forming a decorative insert on a brake pad wear surface, a hat surface, or both, of a brake rotor includes positioning an insert material into a mold and casting a brake rotor in the mold around the insert material. The brake rotor is then processed so that at least a portion of the insert material is visible on the brake pad wear surface, the hat surface, or both. In the method, at least one of a friction coefficient between the decorative insert and a brake pad is substantially the same as a friction coefficient between the brake pad wear surface and the brake pad, a wear rate of the decorative insert is substantially the same as or greater than a wear rate of the brake pad wear surface, or a wear rate of the decorative insert is substantially the same as or greater than a wear rate of the hat surface.

FIG. 4 shows schematically the steps of an exemplary method 200 for forming a decorative insert 110/112 on a brake pad wear surface 106, a hat surface 104, or both, of a brake rotor 100. It should be understood that the steps of method 200 are not necessarily presented in any particular order and all or some of the steps can be performed in a different order. The steps are provided in FIG. 3 for ease of description and illustration. Steps can be added, omitted, or performed simultaneously without departing from the scope of the appended claims.

In FIG. 3, the method 200 begins with step 204, positioning the insert material in the cavity of the mold. In step 206, a molten material is introduced into the cavity of the mold. In step 208, the brake rotor including the decorative inserts is removed from the mold. In step 210, the brake rotor is heat treated to relieve or remove residual stress. In step 212, the brake rotor is machined to specifications and to correct tolerances. Step 214 includes a ferritic nitrocarburizing (FNC) process to obtain the completed brake rotor with the decorative inserts.

In an embodiment, the insert material can be positioned in the cavity of a mold using any suitable means. For example, the insert material can be attached to the sides of the mold cavity using another material that will dissolve or otherwise release the insert material from being secured to the sides of the mold cavity during or after the casting process. In an embodiment, the insert material is positioned in the cavity of the mold in an arrangement that mirrors the desired location of the desired decorative insert 110/112.

In an embodiment, the casting includes introducing a molten material into the cavity of the mold using any suitable method. The molten material can include iron, titanium, aluminum, steel, stainless steel, or a combination thereof. In another embodiment, the molten material includes the brake rotor material.

After the step of casting, the mold is opened and the brake rotor 100 is removed from the cavity to provide the brake rotor 100. The brake rotor 100 including the decorative insert 110/112 is then processed so that at least a portion of the insert material, as the decorative insert 110/112, is visible on the brake pad wear surface 106, the hat surface 104, or both, of the brake rotor 100. Suitable processing methods include cutting, grinding, machining, sanding, scraping, polishing, or the like.

In an embodiment, the method further includes performing at least one process including a nitriding process, a carburizing process, a boronizing process, or an oxidation process to the brake rotor 100 after the step of casting. Any suitable nitriding, carburizing, boronizing, and/or oxidation process may be used, including those available in the art, to provide for the diffusion of N, C, B, and/or O into the brake rotor. The process can also include a combined process such as nitrocarburizing. In an embodiment, after performing the at least one additional process, at least a portion of the decorative insert 110/112 is visible on the brake pad wear surface 106, the hat surface 104, or both, of the brake rotor 100.

In an embodiment, the nitriding process can include immersion of the brake rotor 100 in an anhydrous fused salt bath through which a suitable nitrogen-liberating gaseous substance, for example, dry gaseous ammonia, is introduced at a rate depending on the temperature employed to insure dissociation of the ammonia and cause optimum absorption of nitrogen by the brake rotor 100.

In an embodiment, the carburizing process can include plasma carburization in a vacuum using a hydrocarbon gas at a temperature sufficient to form a glow discharge and to make the brake rotor 100 a cathode. After plasma carburization, diffusion treatment can be used to diffuse the absorbed carbon within the brake rotor 100 to form a carburized layer of a suitable thickness.

In an embodiment, the boronizing process can include pre-coating the brake rotor 100 with an organic binder and subsequently packing the pre-coated brake rotor 100 with boron, followed by heating. The boronizing process can further be modified and/or enhanced using additives such as halides, metal oxides, and the like.

In an embodiment, the oxidation process can include micro arc oxidation or other suitable electrochemical surface processes for generating metal oxide layers in a metal substrate.

In another embodiment, the method can further include a ferritic nitrocarburizing (FNC) process. The brake rotors 100 can be case hardened by the FNC process to enhance wear and corrosion resistance. In the FNC process, nitrogen and carbon are diffused into the brake rotor 100—e.g., into a surface portion, including the surface and beyond the surface to a certain depth into the component. The FNC processing can performed on a ferrous metal being at a sub-critical temperature for the metal. In an embodiment, the temperature can be about 525° C. to about 625° C. Particularly, for the FNC, the component material (e.g., steel or other ferrous alloy) should be at a temperature, in this range, at which the component material is in its ferritic phase, instead of a temperature causing the material to be in an austenitic phase. There are four main types, or classes, of the FNC processing: gaseous, salt bath, ion, plasma, and fluidized-bed. Use of the FNC processing on brake rotors is described in U.S. Pat. Publ. No. 2008/0000550, the entirety of which is incorporated herein by reference. The brake rotors 100 can also be stress relieved after casting or after machining to provide thermal stability and resistance to distortion than can be caused the by the FNC process.

Figure 6:
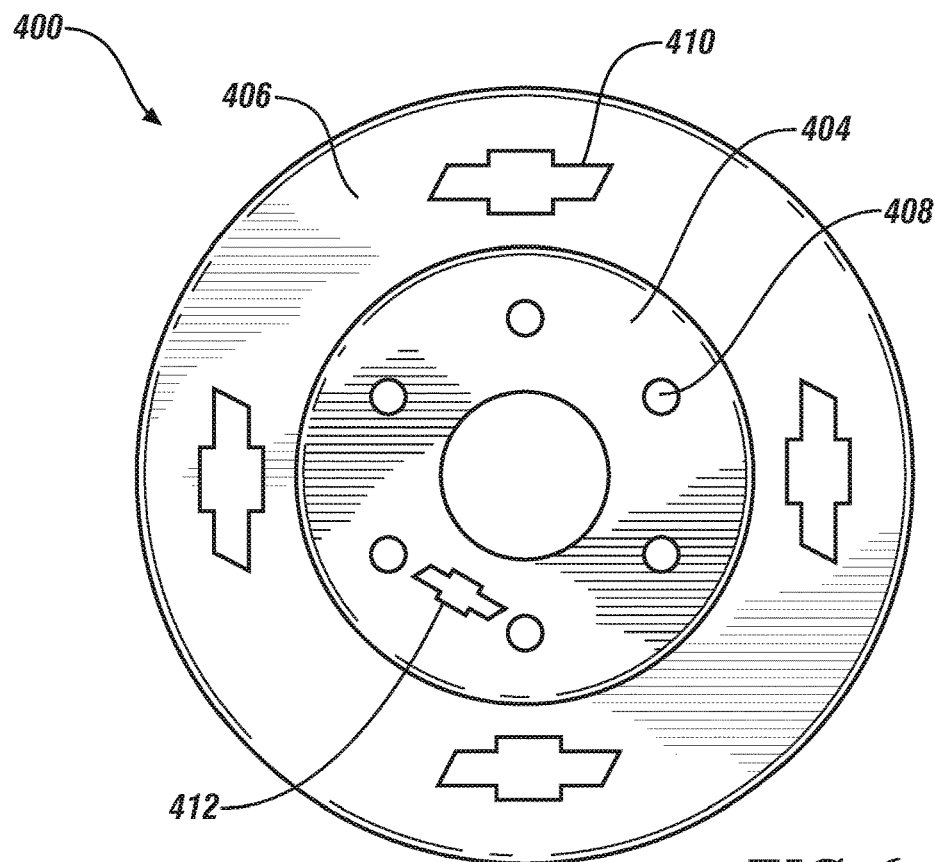
FIG. 6 is a plan view of a brake rotor according to an embodiment.
Figure 7:
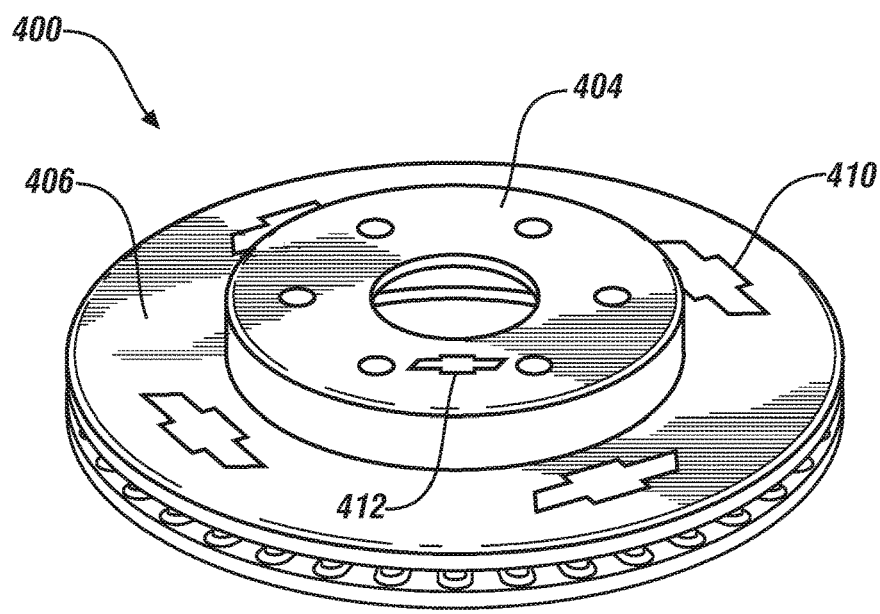
FIG. 7. is a perspective view of a brake rotor according to an embodiment.

In accordance with still another exemplary embodiment, a method for forming a decorative insert 110/112 on a brake pad wear surface 106, a hat surface 104, or both, of a brake rotor 100 is provided. Referring now to FIGS. 6 and 7, the method comprises providing the brake rotor 400 having at least one indentation 410/412 on the brake pad wear surface 406, the hat surface 404, or both. An insert material is applied to the at least one indentation 410/412 to provide the brake rotor 100 including decorative inserts 110/112, the structure of which is described above (FIGS. 1-2).

The brake rotor 400 can be an automobile component that is prepared, for example, by any suitable casting or molding methods. The brake rotor can include suitable materials including iron, titanium, steel, copper, carbon, silicon carbide, nickel, titanium boride, aluminum, alumina, boron nitride, cobalt, magnesium, manganese, an alloy thereof, a metal matrix composite thereof, or a combination comprising at least one of the foregoing. For example, the brake rotor can include cast iron, grey iron, stainless steel, carbon fiber reinforced carbon (carbon-carbon), carbon fiber reinforced silicon carbide, a ceramic matrix composite, mullite, aluminum metal matrix composite (MMC), carbon fiber, graphite, alumina, and the like. In an embodiment, the brake rotor comprises cast iron. For example, additional alloy and/or matrix elements include C, Si, Mn, P, S, Cr, Fe, Ni, Cu, V, Al, N, Ti, W, Mo, Li, Na, K, Mg, B, Zr, or other suitable elements.

FIG. 5 shows schematically the steps of an exemplary method 300 for forming a decorative insert 110/112 on a brake pad wear surface 106, a hat surface 102, or both, of a brake rotor 100. It should be understood that the steps of method 300 are not necessarily presented in any particular order and all or some of the steps can be performed in a different order. The steps are provided in FIG. 5 for ease of description and illustration. Steps can be added, omitted, or performed simultaneously without departing from the scope of the appended claims.

In FIG. 5, the method 300 begins with step 304, forming the at least one indentation 410/412 in the brake pad wear surface 406, the hat surface 404, or both. In step 306, an insert material is applied to the at least one indentation 410/412. In step 308, the insert material is further processed, for example by sintering or curing. In step 310, the brake rotor is machined to specifications to correct tolerances. Step 312 includes a ferritic nitrocarburizing (FNC) process to obtain the completed brake rotor 100 with the decorative inserts 110/112.

In an embodiment, the method further comprises chemically or mechanically forming the at least one indentation 410/412 on the brake pad wear surface 406, the hat surface 404, or both. The indentations 410/412 can be formed using any suitable method, including those available in the art. In an embodiment, the indentations 410/412 can be formed by laser cutting, mechanical cutting, chemical etching, milling, ablation, drilling, plasma cutting, sand blasting, flux cutting, carbon arc cutting, electric discharge machining. In another embodiment, the method of forming the indentations 410/412 includes casting a brake rotor 400 with pre-formed indentations 410/412, for example, with indentations 410/412 that are formed during or by the casting process. The indentations 410/412 can optionally be cleaned, smoothed, or polished using any suitable method.

In an embodiment, the at least one indentation 410/412 can be used to pre-define a shape of the decorative insert 110/112. For example, a mechanical method can be used to form a specified indentation pattern. Alternatively, a mask can be applied to the brake rotor around a region having the shape of the decorative insert 110/112, the etching agent can then be applied, and then the masking can be removed to provide the indentation 410/412. Any suitable etching agent and masking agents can be used, for example based on the material of the brake rotor 100/400.

In an embodiment, the at least one indentation 410/412 has a depth of about 0.5 to about 10 millimeters (mm), about 0.5 to about 7.5 mm, about 0.5 to about 5 mm, about 0.5 to about 4 mm, about 0.5 to about 3 mm, about 0.5 to about 2 mm, or about 0.5 to about 1 mm. For example, the at least one indentation 410/412 has a depth of about 0.75 to about 8 mm, about 1.0 to about 6 mm, about 1.25 to about 4 mm, about 1.5 to about 3 mm, or about 1.75 to about 2.0 mm. As used herein, the depth is the largest feature of the at least one indentation 410/412 in the plane perpendicular to the brake pad wear surface 406 or the hat surface 404. In still another embodiment, a plurality of indentations 410/412 is provided with each indentation 410/412 independently having a thickness as described.

In an embodiment, the at least one indentation 410/412 has a width of about 10 to about 150 mm, about 25 to about 150 mm, about 50 to about 150 mm, or about 75 to about 150 mm. For example, the at least one indentation 410/412 has a width of about 20 to about 120 mm, about 20 to about 100 mm, or about 20 to about 80 mm. As used herein, the width is the widest horizontal feature of the indentation 410/412 in the plane of the brake pad wear surface 406 or the hat surface 404. In still another embodiment, a plurality of indentations 410/412 is provided with each indentation 410/412 independently having a width as described.

In an embodiment, a plurality of indentations 410/412 are provided and have an inter-indentation spacing of about 0.5 to about 150 mm, about 0.5 to about 100 mm, about 0.5 to about 50 mm, about 0.5 to about 25 mm, about 0.5 to about 15 mm, about 0.5 to about 10 mm, about 0.5 to about 5 mm, about 0.5 to about 2.5 mm, or about 0.5 to about 1.0 mm. In still another embodiment, a plurality of indentations 410/412 is provided with each indentation independently having a spacing from an adjacent indentation 410/412 as described.

In an embodiment, the insert material is applied by at least one of laser powder cladding, laser spraying, laser deposition, chemical vapor deposition, physical vapor deposition, sputtering deposition, powder coating, thermal spraying plasma spraying, sintering, electrodeposition, vacuum plating, vitreous enameling, dipping, electrospraying, or a combination thereof. The method of application can be determined based on the insert material and the brake rotor material. In an embodiment, the applied insert material can be further processed by methods such as sintering, curing, enameling, or other suitable methods based on the insert material and the application method. In an embodiment, the insert material is treated by a method to provide a porous surface that can match the wear rate or other properties of the brake rotor surfaces.

In an embodiment, at least a portion of a volume of the at least one indentation 410/412 is not filled with the insert material. In another embodiment, the entire volume of the indentation 410/412 is filled with the insert material. In still other embodiments, a plurality of indentations 410/412 are provided with each indentation independently having at least a portion of a volume that is not filled with the insert material or the entire volume of the indentation 410/412 filled with the insert material. In an embodiment, the volume of each indentation 410/412 is independently filled with about 20, 30, 40, 50, 60, 70, 80, 90, 99, or 100 vol % of the insert material.

In another embodiment, the at least one indentation 410/412 is provided as a series of micro indentations each having a depth of about 0.5 to about 10 mm, a width of about 0.1 to about 10 mm, and an inter-indentation spacing of about 0.1 to about 1 mm. One or more of the micro indentations can be filled with the insert material. The micro indentations can be arranged to define the custom design feature in a manner similar to the indentations 410/412. In other words, a custom design feature can be provided using adjacent filled micro indentations to provide an appearance similar to (or distinct from) a similarly arranged pre-design feature provided by a single indentation 410/412.

In an embodiment, the method further includes performing at least one process including: a nitriding process, a carburizing process, a boronizing process, or an oxidation process to the brake rotor after the step of applying, as described above.

In still another embodiment, the brake rotor 100 can be further coated with a sacrificial or barrier-type coating on the surface. The sacrificial coatings, such as a zinc-rich coating, can provide additional corrosion protection. The sacrificial coatings can be supplemented or replaced by barrier coatings to further prevent corrosion. Additionally, coatings on the wheel interface of the brake rotor 100 can incorporate polytetrafluoroethylene (PTFE) to enhance resistance to wheel click.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A brake rotor comprising:
   a brake pad wear surface;
   a hat surface; and
   a decorative insert comprising an insert material,
   wherein the decorative insert is disposed on the brake pad wear surface;
   a wear rate of the decorative insert is greater than a wear rate of the brake pad wear surface; and
   at least a portion of the decorative insert is visible on the brake pad wear surface.

2. The brake rotor of claim 1, wherein the insert material comprises a metallic material, a ceramic material, a mineral material, a glass material, or a combination thereof.

3. The brake rotor of claim 1, wherein the insert material comprises aluminum, copper, manganese, a porcelain enamel, titanium, steel, stainless steel, nickel, zirconium, silicon carbide, boron carbide, tungsten carbide, nickel oxide, zirconium oxide, chromium carbide, alumina, aluminum titanium, magnesium zirconate, silicon nitride, boron nitride, titanium diboride, a silicate mineral, or a combination comprising at least one of the foregoing.

4. The brake rotor of claim 1, wherein the decorative insert defines a custom design feature.

5. The brake rotor of claim 1, wherein the brake rotor comprises iron, titanium, steel, copper, carbon, silicon carbide, nickel, titanium boride, aluminum, boron nitride, cobalt, magnesium, manganese, an alloy thereof, a metal matrix composite thereof, or a combination comprising at least one of the foregoing.

6. The brake rotor of claim 1, wherein a portion of the brake pad wear surface that includes the decorative insert has a wear rate that is greater than a wear rate of the brake pad wear surface that does not include the decorative insert.

7. A method for forming a decorative insert on a brake pad wear surface, the method comprising:
   positioning an insert material into a mold;
   casting a brake rotor in the mold around the insert material; and
   processing the brake rotor so that at least a portion of the insert material is visible on the brake pad wear surface;
   wherein
      a wear rate of the decorative insert is greater than a wear rate of the brake pad wear surface.

8. The method of claim 7, wherein a thickness of the decorative insert is about 0.5 to about 10 millimeters.

9. The method of claim 7, wherein the insert material comprises a metallic material, a ceramic material, a mineral material, a glass material, or a combination thereof.

10. The method of claim 7, wherein the insert material comprises aluminum, copper, manganese, a porcelain enamel, titanium, steel, stainless steel, nickel, zirconium, silicon carbide, boron carbide, tungsten carbide, nickel oxide, zirconium oxide, chromium carbide, alumina, aluminum titanium, magnesium zirconate, silicon nitride, boron nitride, titanium diboride, a silicate mineral, or a combination comprising at least one of the foregoing.

11. The method of claim 7, further comprising performing at least one process comprising:
   a nitriding process;
   a carburizing process;
   a boronizing process; or
   an oxidation process
   to the brake rotor after the step of casting.

12. The method of claim 7, wherein a portion of the brake pad wear surface that includes the decorative insert has a wear rate that is greater than a wear rate of the brake pad wear surface that does not include the decorative insert.

* * * * *